United States Patent
Hallek et al.

(10) Patent No.: US 10,551,487 B2
(45) Date of Patent: Feb. 4, 2020

(54) METHOD FOR DETECTING A BLOCKED STATE OF AN ULTRASONIC SENSOR, ULTRASONIC SENSOR DEVICE, AND MOTOR VEHICLE

(71) Applicant: VALEO Schalter und Sensoren GmbH, Bietigheim-Bissingen (DE)

(72) Inventors: Michael Hallek, Bietigheim-Bissingen (DE); Michael Ludwig, Mannheim (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 211 days.

(21) Appl. No.: 15/021,714

(22) PCT Filed: Sep. 10, 2014

(86) PCT No.: PCT/EP2014/069305
§ 371 (c)(1),
(2) Date: Mar. 14, 2016

(87) PCT Pub. No.: WO2015/039941
PCT Pub. Date: Mar. 26, 2015

(65) Prior Publication Data
US 2016/0223658 A1 Aug. 4, 2016

(30) Foreign Application Priority Data

Sep. 17, 2013 (DE) .......................... 10 2013 015 410

(51) Int. Cl.
*G01S 7/52* (2006.01)
*G01S 15/87* (2006.01)

(52) U.S. Cl.
CPC ...... *G01S 7/52004* (2013.01); *G01S 7/52006* (2013.01); *G01S 15/876* (2013.01);
(Continued)

(58) Field of Classification Search
CPC . G01S 7/52; G01S 15/87; G01S 15/93; G01S 15/931; G01S 7/52004;
(Continued)

(56) References Cited

U.S. PATENT DOCUMENTS 4,570,881 A * 2/1986 Lustenberger ......... B64D 15/20
244/134 F
5,539,289 A * 7/1996 Wiget ................... B60S 1/0818
318/483
(Continued)

FOREIGN PATENT DOCUMENTS

DE 10247971 A1 5/2004
DE 102005038649 A1 2/2007
(Continued)

OTHER PUBLICATIONS

International Search Report issued in corresponding application No. PCT/EP2014/069305 dated Nov. 4, 2014 (5 pages).
(Continued)

Primary Examiner — Hovhannes Baghdasaryan
Assistant Examiner — Amie M Ndure
(74) Attorney, Agent, or Firm — Osha Liang LLP

(57) ABSTRACT

The invention relates to a method for detecting a blocked state of an ultrasonic sensor (3) of a motor vehicle (1), wherein an actual value of at least one oscillation parameter (fR) of the ultrasonic sensor (3) is sensed and is compared with a reference value by means of an evaluation unit (4) in order to detect a blocked state, wherein a current temperature (T) to which the ultrasonic sensor (3) is exposed is detected by means of a temperature detecting device (8), and the reference value is determined as a function of the current temperature (T) by means of the evaluation unit (4).

9 Claims, 3 Drawing Sheets

(52) U.S. Cl.
CPC ... *G01S 15/931* (2013.01); *G01S 2007/52009* (2013.01); *G01S 2015/932* (2013.01); *G01S 2015/938* (2013.01)

(58) Field of Classification Search
CPC .............. G01S 7/52006; G01S 15/876; G01S 2015/938; G01S 2007/52009; G01S 2015/932
See application file for complete search history.

(56) References Cited

U.S. PATENT DOCUMENTS

| | | | | |
|---|---|---|---|---|
| 5,920,167 | A * | 7/1999 | Wiget | B60S 1/0818 |
| | | | | 318/444 |
| 7,607,352 | B2 | 10/2009 | Endou | |
| 2001/0020777 | A1* | 9/2001 | Johnson | B60R 21/01536 |
| | | | | 280/735 |
| 2002/0023498 | A1* | 2/2002 | Tsuzuki | G01N 29/12 |
| | | | | 73/617 |
| 2002/0047780 | A1* | 4/2002 | Nishimoto | G01S 7/52004 |
| | | | | 340/540 |
| 2003/0168838 | A1* | 9/2003 | Breed | B60R 21/01536 |
| | | | | 280/735 |
| 2004/0130442 | A1* | 7/2004 | Breed | B60C 11/24 |
| | | | | 340/443 |
| 2004/0226378 | A1* | 11/2004 | Oda | B06B 1/0215 |
| | | | | 73/586 |
| 2005/0046584 | A1* | 3/2005 | Breed | B60C 11/24 |
| | | | | 340/13.31 |
| 2005/0188768 | A1* | 9/2005 | Hayashi | G01H 17/00 |
| | | | | 73/649 |
| 2005/0192727 | A1* | 9/2005 | Shostak | B60C 11/24 |
| | | | | 701/37 |
| 2005/0273218 | A1* | 12/2005 | Breed | B60C 11/24 |
| | | | | 701/2 |
| 2006/0208169 | A1* | 9/2006 | Breed | B60N 2/002 |
| | | | | 250/221 |
| 2007/0157728 | A1* | 7/2007 | Endou | B06B 1/0261 |
| | | | | 73/579 |
| 2008/0195261 | A1* | 8/2008 | Breed | B60R 21/0132 |
| | | | | 701/2 |

FOREIGN PATENT DOCUMENTS

| | | |
|---|---|---|
| DE | 102005042853 A1 | 3/2007 |
| DE | 102007059908 A1 | 6/2009 |
| DE | 102009040992 A1 | 3/2011 |
| DE | 102010021960 A1 | 12/2011 |
| DE | 102011016946 A1 | 10/2012 |
| DE | 102012002979 A1 | 8/2013 |

OTHER PUBLICATIONS

Written Opinion of the International Searching Authority issued in corresponding application No. PCT/EP2014/069305 dated Nov. 4, 2014 (9 pages).

German Search Report issued in corresponding application No. DE102013015410.3 dated Mar. 10, 2014 (5 pages).

* cited by examiner

METHOD FOR DETECTING A BLOCKED STATE OF AN ULTRASONIC SENSOR, ULTRASONIC SENSOR DEVICE, AND MOTOR VEHICLE

The invention relates to a method for detecting a blocked state of an ultrasonic sensor of a motor vehicle, wherein an actual value of at least one oscillation parameter of the ultrasonic sensor is sensed and is compared with a reference value by means of an evaluation unit in order to detect the blocked state. The invention also relates to an ultrasonic sensor device for a motor vehicle, which is designed for carrying out such a method, and to a motor vehicle having such an ultrasonic sensor device.

Methods for detecting a blocked state of an ultrasonic sensor are already known from the prior art. This relates to detecting a situation in which the ultrasonic sensor is covered by an additional mass, for example, by dirt and/or snow and/or ice. Since ultrasonic sensors are also being used with increasing frequency nowadays outside of the actual parking assist functionality, such as, for example, for driving support with active braking interventions in the event of a detected risk of collision, it should be ensured, in the operation of the motor vehicle, that the ultrasonic sensors present on the motor vehicle can reliably detect the obstacles located in the environment of the motor vehicle and can also reliably sense the distances up to a predetermined range. If the ultrasonic sensors are covered with an additional mass, this should be reliably detected. The known methods for detecting ice or dirt are based, in principle, on the evaluation of side effects caused by the additional mass on the ultrasonic sensor. An additional mass, for example, influences the so-called final oscillation time of the diaphragm of the ultrasonic sensor, or a virtual echo or a fraudulent echo is generated, which can be detected by means of an appropriate evaluation of the electric received signal of the ultrasonic sensor. In the least favourable case, it is also possible that the additional mass may neither result in a change in the final oscillation time of the diaphragm nor generate additional echoes. In such situations, the blocked state of the ultrasonic sensor cannot be detected, and the sensor is no longer capable of detecting a real object or reliably sensing the distances.

In order to also enable detection of the blocked state of the ultrasonic sensor in such unfavourable situations, a method is already proposed in the prior art, according to which a validation is carried out such that the ultrasonic sensor is switched into a checking mode in which the sensitivity of the ultrasonic sensor is substantially increased as compared to the normal operating mode. In this checking mode, a check is carried out to determine whether the ultrasonic sensor can receive so-called ground reflections or reflections on other objects, which are usually blocked out in the normal operating mode due to the weaker sensitivity. The disadvantage of such a checking mode, however, is that the ultrasonic sensor is unavailable for the actual measurements for a certain time period and so a time delay for the availability of the sensor sets in.

An alternative method, as described in the document DE 102 47 971 A1, provides a certain level of improvement in this regard. In this case, the characteristic frequency or the resonance frequency of the ultrasonic sensor is measured and compared with stored reference values. This method is based on the fact that the resonance frequency of the ultrasonic sensor is a direct indicator of soiling or a layer of ice or snow, since this additional layer influences the mass of the harmonic oscillation. The reason is that the additional mass of the soiling or the layer of ice or snow also induces a change in the oscillating mass and, therefore, also in the resonance frequency of the sensor.

In order to enable detection of a state of an ultrasonic sensor in which said ultrasonic sensor is covered with dirt and/or ice and/or snow, DE 10 2009 040 992 A1 proposes to sense the decay frequency of the ultrasonic sensor after an excitation of the diaphragm and to compare said decay frequency with the excitation frequency. Depending on the result of this comparison, it is determined whether the ultrasonic sensor is blocked or not.

In addition, DE 10 2010 021 960 A1 describes a method in which, in order to detect the blocked state of an ultrasonic sensor, the final oscillation time of the diaphragm is evaluated over multiple measuring cycles of the ultrasonic sensor. A further validation in this case could be that the detection of the blocked state takes place only if a temperature of the environment of the motor vehicle is below a specified limit value. This limit value can be, for example, 0° C. The error rate in the detection of the blocked state can therefore be reduced.

The problem addressed by the invention is that of presenting a solution as to how the blocked state of the ultrasonic sensor can be particularly reliably detected using a method of the initially mentioned type.

This problem is solved, according to the invention, by a method, by an ultrasonic sensor device, and by a motor vehicle having the features according to the respective independent claims. Advantageous embodiments of the invention are the object of the dependent claims, the description, and the figures.

A method according to the invention is used for detecting a blocked state of an ultrasonic sensor of a motor vehicle. The blocked state is intended to mean a state covered by an additional mass, such as, in particular, a state of the ultrasonic sensor covered by ice and/or snow and/or dirt. An actual value of at least one oscillation parameter of the ultrasonic sensor is sensed, such as, for example, the actual value of a resonance frequency and/or the actual value of a final oscillation time and/or the actual value of an oscillation amplitude. The actual value of the oscillation parameter is compared with a reference value by means of an electronic evaluation unit and, depending on this comparison, a check is carried out to determine whether the ultrasonic sensor is blocked or not. According to the invention, it is provided that a current temperature to which the ultrasonic sensor is exposed is detected by means of a temperature detecting device of the motor vehicle and the reference value is determined by means of the evaluation unit as a function of the current temperature and is therefore defined or set during operation.

The invention is based on the finding that the blocked state of an ultrasonic sensor can be reliably detected, in principle, by evaluating an oscillation parameter and, in particular, the resonance frequency of the sensor is a reliable measure of an additional mass on the diaphragm, and that, in the prior art, however, the evaluation of the resonance frequency only leads to inadequate results in many situations. A further finding is that the inadequate results are due to the fact that there are also additional factors that influence the resonance frequency and other oscillation parameters of the ultrasonic sensor. In fact, the resonance frequency of the ultrasonic sensor also shifts as a result of a change in temperature, which can occur due to a temperature dependence of the material stiffness (modulus of elasticity) of the diaphragm itself and/or the adjacent components. In order to compensate for this change in the oscillation parameter due to the temperature dependence of the material stiffness, the reference value, with which the current actual value of the oscillation parameter of the ultrasonic sensor is compared, is set as a function of the current temperature to which the ultrasonic sensor is exposed at that instant. In this manner, the blocked state of the ultrasonic sensor can be detected particularly reliably and appropriate safety measures can be implemented, as necessary, such as, for example, issuing a warning message to the driver and/or deactivating at least one driver assistance system in the motor vehicle.

The ultrasonic sensor can be, on the one hand, a sensor whose diaphragm is disposed in a through-hole of a cladding part, for example a bumper, of the motor vehicle and is therefore visible from outside the motor vehicle. On the other hand, it can also be provided, as an alternative, that the ultrasonic sensor is disposed on a back side of the cladding part in such a way that the diaphragm rests on the back side of the cladding part and transmits and receives the ultrasonic signals through the material of the cladding part. Specifically in the case of such an arrangement of the ultrasonic sensor on the cladding part in which the ultrasonic sensor is covered and is not visible from the outside, the change in the oscillation parameter or the oscillation properties of the ultrasonic sensor due to the temperature dependence of the material stiffness is particularly significant.

The evaluation unit is preferably a central control unit, by means of which multiple ultrasonic sensors of the motor vehicle can be controlled. This control unit can be used, for example, for controlling a group of ultrasonic sensors disposed on a bumper. It can also be a control unit, however, which is common to all ultrasonic sensors disposed on the front and on the rear bumper.

Therefore, a current temperature to which the ultrasonic sensor is exposed is detected. With respect to the detection of the temperature by means of the temperature detection device, different embodiments can be provided:

On the one hand, the current temperature can be measured directly on and/or in the sensor. This means that the current temperature is detected by means of a temperature sensor of the temperature detection device disposed on and/or in the ultrasonic sensor or on and/or in a housing of the ultrasonic sensor. This embodiment is based on the finding that the measurement of an ambient temperature of the motor vehicle itself does not always reflect the actual temperature to which the sensor is exposed. This is very often the case when a sensor is placed in the vicinity of a heat source, such as, for example, very close to an exhaust system or an exhaust-gas flow. The temperature directly at the sensor then deviates substantially from the ambient temperature of the motor vehicle. The detection of the temperature directly on and/or in the ultrasonic sensor therefore makes it possible to highly precisely determine the reference value and, therefore, to particularly reliably detect the blocked state of the ultrasonic sensor.

On the other hand, a current ambient temperature of the ultrasonic sensor can also be detected, as the temperature, by means of a temperature sensor of the temperature detection device disposed in the area or in the direct vicinity of the ultrasonic sensor. This temperature sensor is preferably disposed in the direct vicinity of the ultrasonic sensor, namely at a maximum distance of 10 to 20 cm. This also makes it possible to precisely determine the reference value during operation.

Preferably, the actual value of a resonance frequency of the ultrasonic sensor is detected as an oscillation parameter. A ideal value of the resonance frequency can then be determined as a function of the current temperature, as the reference value for the resonance frequency. In other words, a theoretical resonance frequency (ideal value of the resonance frequency) is determined on the basis of the measured temperature. The dependence of the theoretical resonance frequency on the measured temperature can be stored in the evaluation unit, for example, as a formula or in the form of a look-up table in this case and is then used for determining the ideal value of the resonance frequency. When the ultrasonic sensor is checked with respect to the blocked state, the ideal value of the resonance frequency is therefore compared with the actually measured actual value of the resonance frequency as the oscillation parameter. The resonance frequency is preferably a resonance frequency of the diaphragm during a decrease in oscillations of the diaphragm, i.e., immediately after an excitation of the diaphragm, for example, by means of a piezo element. The evaluation of the resonance frequency or the characteristic frequency has proven particularly advantageous with respect to the detection of an additional mass on the diaphragm and, therefore, with respect to the detection of a covered state of the ultrasonic sensor.

In addition or alternatively thereto, it can also be provided, however, that a final oscillation time of the diaphragm is used as the oscillation parameter of the ultrasonic sensor. In this embodiment, the actual value of the final oscillation time is detected as an oscillation parameter, and an ideal value of the final oscillation time is determined as a function of the current temperature, as the reference value for the final oscillation time. The final oscillation time is intended to mean a reverberation time during which a reverberation of the diaphragm takes place after an excitation. Specifically, it has been shown that this final oscillation time can also change as a function of the temperature of the ultrasonic sensor and, in addition, is influenced by an additional mass on the diaphragm. This embodiment, in combination with the evaluation of the resonance frequency, if necessary, therefore also makes possible reliable inferences of the blocked or covered state of the ultrasonic sensor.

In addition or alternatively thereto, it can also be provided that an oscillation amplitude of the diaphragm is used as the oscillation parameter of the ultrasonic sensor. In this embodiment, the actual value of the amplitude is detected as an oscillation parameter, and an ideal value of the amplitude is determined as a function of the current temperature, as the reference value for the amplitude. The oscillation amplitude is preferably an amplitude of the diaphragm oscillation during a decrease in oscillations of the diaphragm, i.e., immediately after an excitation of the diaphragm.

Preferably, the comparison between the particular current actual value of the oscillation parameter and the particular current reference value is carried out repeatedly. Both the measurement of the oscillation parameter and the detection of the sensor temperature can be carried out repeatedly, for example, periodically. Depending on the measured values of the sensor temperature, a current reference value can be determined, in each case, for the comparison with the actual value of the oscillation parameter. Preferably, it is then provided that a mean value is determined from comparison results, such as, for example, from a predetermined number of comparisons, and this mean value is then evaluated in order to detect the blocked state. A mean value of multiple measurements is therefore calculated. This has the advantage that temporary fluctuations in the resonance frequency and/or in the sensor temperature can be filtered out. Such fluctuations in the resonance frequency can occur, for example, due to a very briefly adhering soiling. Such brief soiling can be, for example, gravel, leaves, or other material, which falls off immediately after impact or which is blown off by the wind of the vehicle's own speed.

If a blocked state of the ultrasonic sensor is detected, it is also possible to determine an extent and/or a type or cause of the blockage of the ultrasonic sensor depending on the comparison between the actual value of the oscillation parameter and the reference value. For example, a deviation or a difference between the actual value of the oscillation parameter, on the one hand, and the current reference value, on the other hand, can be determined and used as a direct indicator of the type of blockage and/or the intensity of the blockage. This embodiment proves to be advantageous, in particular, when multiple functionalities are provided in the motor vehicle on the basis of measured values of the ultrasonic sensor or these measured values are used by multiple driver assistance systems, such as, for example, by a parking aid, an automatic braking assistance system, and the like. Depending on the detected type and/or the extent of the blockage, it is then possible to shut off, for example, some of the functionalities or the assistance systems.

This can also be implemented by determining a reduction, which is caused by the blockage, of a detection zone of the ultrasonic sensor, in particular of the range thereof, with respect to a reference detection zone of a non-blocked ultrasonic sensor, depending on the comparison and, in particular, depending on the determined extent and/or type of blockage. If the reduction of the detection zone and, therefore, the currently available detection zone of the ultrasonic sensor is known, it is therefore possible to assess which driver assistance systems or functionalities in the motor vehicle can still be used in this current detection zone of the ultrasonic sensor, and which cannot. An assessment of each driver assistance system can therefore be carried out separately or individually, and individual driver assistance systems can be shut off as necessary and/or warning messages regarding individual functionalities can be output. A certain reduction of the detection zone or the range of the ultrasonic sensor can be accepted, for example, for the functionality of a parking aid, but not for the driver assistance system that is used for automatically braking the motor vehicle after the detection of a risk of a collision, or for an automatic parking assistance system, which is used for measuring parking spaces and for automatically calculating a parking trajectory for the motor vehicle. System-specific warning messages for the individual driver assistance systems can also be generated.

Preferably, at least two ultrasonic sensors of the motor vehicle are each checked with respect to the blocked state. In order to permit possible differences in the temperature of the ultrasonic sensors to be taken into consideration, it is provided in one embodiment that, during operation, the current temperature is detected separately for each ultrasonic sensor and the reference value is determined separately for each ultrasonic sensor as a function of the particular temperature. A temperature gradient between multiple ultrasonic sensors can therefore be considered individually, because the temperature to which the particular ultrasonic sensor is exposed is measured for each ultrasonic sensor.

The invention also relates to an ultrasonic sensor device for a motor vehicle, comprising an ultrasonic sensor and an evaluation unit, which detects an actual value of at least one oscillation parameter of the ultrasonic sensor, compares said actual value with a reference value and, depending on the comparison, detects a blocked state of the ultrasonic sensor. The evaluation unit can determine the reference value as a function of a detected current temperature to which the ultrasonic sensor is exposed.

A motor vehicle according to the invention, in particular a passenger car, comprises an ultrasonic sensor device according to the invention.

The preferred embodiments, which are presented with reference to the method according to the invention, and their advantages apply similarly for the motor vehicle according to the invention and for the ultrasonic sensor device according to the invention.

Further features of the invention will become apparent from the claims, the figures, and the description of the figures. All the features and combinations of features mentioned above in the description, and the features and combinations of features mentioned in the description of the figures that follows and/or shown only in the figures can be used not only in the particular combination indicated, but also in other combinations or alone.

The invention is explained in greater detail on the basis of a preferred exemplary embodiment and with reference to the attached drawings.

Figure 1:
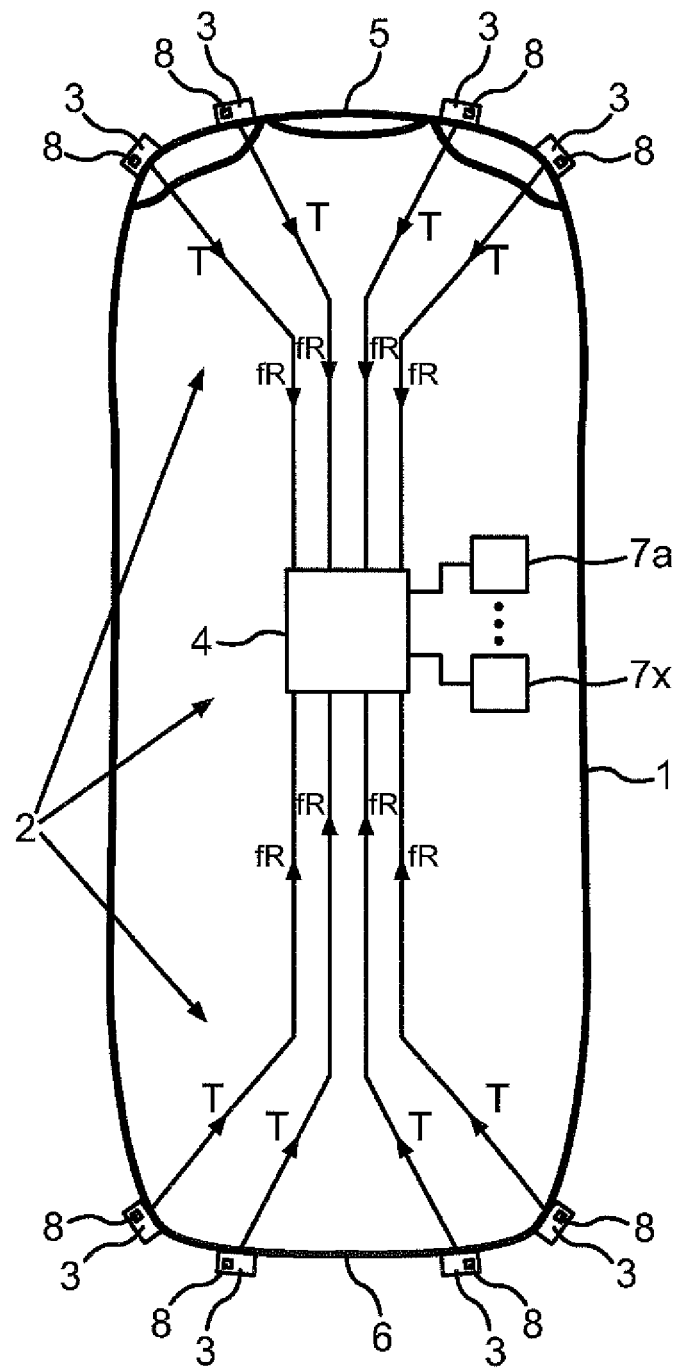
FIG. 1 shows a schematic illustration of a motor vehicle comprising an ultrasonic sensor device according to one embodiment of the invention.

A motor vehicle 1 illustrated in FIG. 1 is, for example, a passenger car. The motor vehicle 1 comprises an ultrasonic sensor device 2, which has a plurality of ultrasonic sensors 3 and an electronic evaluation unit 4, for example, in the form of a control unit. The number and the arrangement of the ultrasonic sensors 3 are shown in FIG. 1 merely by way of example and can vary depending on the embodiment. In the exemplary embodiment, a plurality of ultrasonic sensors 3 is disposed on a front bumper 5 of the motor vehicle 1; a plurality of ultrasonic sensors 3 is also disposed on a rear bumper 6 of the motor vehicle 1. With regard to the type of installation of the ultrasonic sensors 3, two alternative embodiments can be provided. On the one hand, the ultrasonic sensors 3 can each be disposed in a hole in the particular bumper 5, 6, so that the diaphragms of the particular ultrasonic sensors 3 are disposed within the particular through-hole of the bumper 5, 6. On the other hand, a covered installation of the ultrasonic sensors 3 can also be provided behind the particular bumper 5, 6, however, so that the diaphragms of the ultrasonic sensors 3 rest against the back side of the particular bumper 5, 6 and transmit and receive the ultrasonic signals through the material of the bumper 5, 6.

The ultrasonic sensors 3 are each designed for detecting distances to obstacles located in an environment of the motor vehicle 1. The particular measured distance values are transmitted by the ultrasonic sensors 3 to the central evaluation unit 4, which processes the measured values of the ultrasonic sensors 3. Multiple driver assistance systems 7*a* to 7*x* can be provided in the motor vehicle 1, which systems are designed for providing different functionalities in the motor vehicle 1, specifically on the basis of the measured distances of the ultrasonic sensors 3. In FIG. 1, the different driver assistance systems 7*a* to 7*x* are shown as separate components; multiple functionalities can also be provided by a common control unit, however, which then performs the function of multiple driver assistance systems. The following systems, for example, can be provided as driver assistance systems 7a to 7x: a parking-aid system, in which the measured distances are output acoustically and/or visually, an automatic parking assistance system for automatic parking, an automatic braking assistance system, which is used for autonomously braking the motor vehicle 1 due to a risk of collision detected on the basis of the measured values of the ultrasonic sensors 3, a system for blind spot monitoring, a system for distance control, a collision detection system, and the like.

The evaluation unit 4 can also perform a separate check for each ultrasonic sensor 3 to determine whether this ultrasonic sensor 3 is covered by an additional mass, such as soiling and/or ice and/or snow, and is therefore blocked and is prevented from providing its function. For this purpose, a temperature detection device 8 is provided for each ultrasonic sensor 3, which device is designed for detecting the actual temperature T to which the particular ultrasonic sensor 3 is exposed. In other words, the temperature detection device 8 detects the particular sensor temperature. To this end, each temperature detection device 8 comprises a temperature sensor, which is disposed in and/or on the housing of the particular ultrasonic sensor 3 or in the direct vicinity of the ultrasonic sensor 3, such as, for example, on a holder of the particular ultrasonic sensor 3. The current temperature T or the measured temperature values of the particular ultrasonic sensor 3 are transmitted to the central evaluation unit 4 and are evaluated by this unit.

In addition, in the case of each ultrasonic sensor 3, a current resonance frequency fR is sensed and transmitted to the evaluation unit 4. The resonance frequency fR is the characteristic frequency of the particular diaphragm, which varies independently of the actual oscillating mass and is measured immediately after an excitation of the diaphragm, i.e., during the decrease in oscillations of the diaphragm. The resonance frequency fR, therefore, is a decay frequency.

Depending on the measured values of the temperature T and the resonance frequency fR that are received, the evaluation unit 4 then determines, separately for each ultrasonic sensor 3, whether this ultrasonic sensor 3 is actually blocked or not. A method for detecting such a blocked state of a single ultrasonic sensor 3 is explained in greater detail in the following, wherein this method can also be applied in an analogous manner to other ultrasonic sensors 3.

At this point it should be noted that the invention is not limited to the detection of the resonance frequency fR as an oscillation parameter. Other oscillation parameters that are correlated with the oscillating mass can also be used, such as, for example, the so-called final oscillation time and/or the oscillation amplitude.

Figure 2:
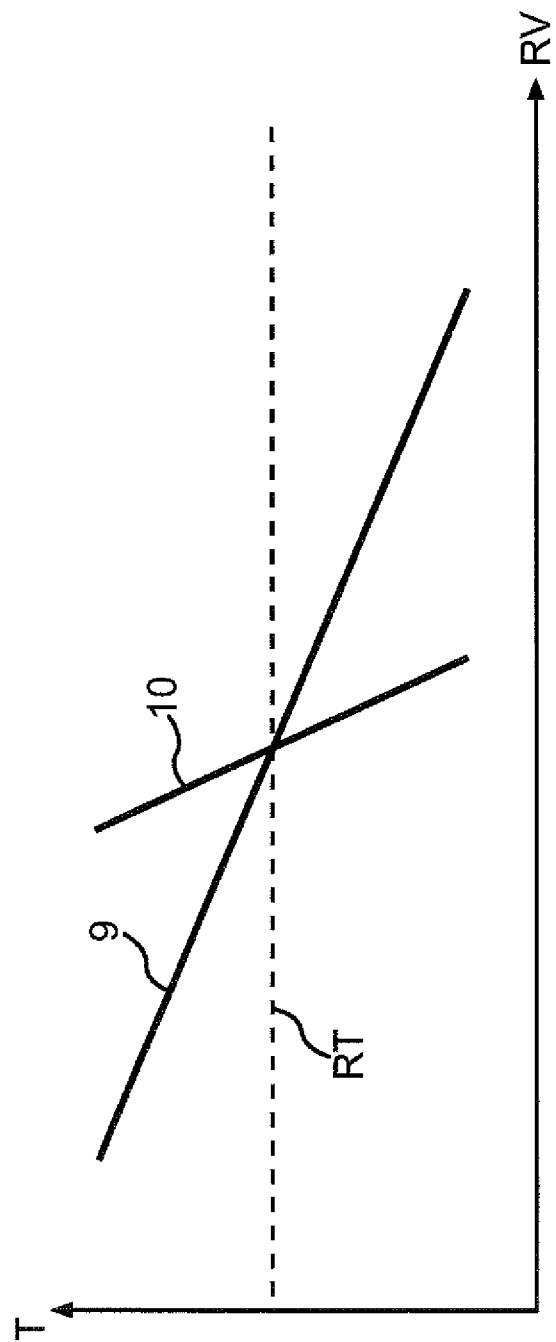
FIG. 2 shows a dependence of a resonance frequency on a temperature of an ultrasonic sensor for two different types of installation of the ultrasonic sensor on the motor vehicle.
Figure 3:
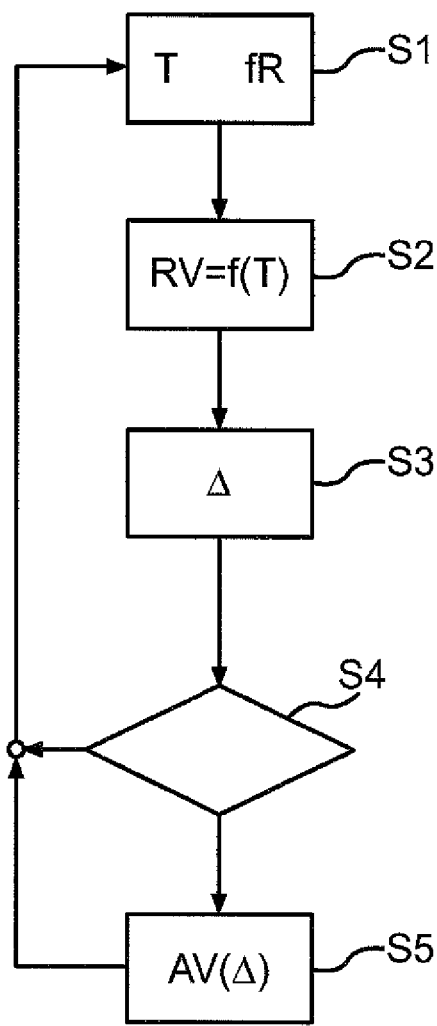
FIG. 3 shows a flow chart for a method according to one embodiment of the invention.

With reference to FIG. 3, the method starts in a first step S1, in which the evaluating unit 4 receives the current temperature T and the current resonance frequency fR of the ultrasonic sensor 3. In a further step S2, the evaluation unit 4 determines a reference value RV as a function of the current temperature T. The temperature-dependent reference value RV is a theoretical resonance frequency of the ultrasonic sensor 3, which, theoretically, should set in at the actual temperature T. The dependence of the theoretical resonance frequency and, therefore, of the reference value RV on the current temperature T can be stored in the evaluation unit 4, for example, as a mathematical formula or as a look-up table and is then used, during operation, for determining the reference value RV. A dependence of the theoretical resonance frequency and, therefore, of the reference value RV on the current temperature T, which is provided by way of example, is shown in FIG. 2, wherein the room temperature is labelled RT. Two curves are shown in FIG. 2, specifically a first linear dependence 9 for the covered installation of the ultrasonic sensor 3 behind the bumper 5, 6 and a second linear dependence 10 for the conventional installation of the ultrasonic sensor 3 in a through-hole of the bumper 5, 6. The dependence of the theoretical resonance frequency RV on the temperature T is particularly significant when the ultrasonic sensor 3, with its diaphragm, is mounted so as to be hidden behind a bumper 5, 6, in particular a bumper made from plastic.

Referring to FIG. 3 again, in a further step S3, a deviation Δ of the measured current resonance frequency fR from the reference value RV is determined. The deviation Δ can be calculated, for example, as a difference, and can then be set in relation to the reference value RV, so that the deviation Δ is calculated as a percentage. In a further step S4, the evaluation unit 4 can check to determine whether a sufficient number of measurements or deviations Δ is present or not. If this is not the case, the method returns to step S1. Otherwise, according to step S5, a mean value AV of the deviations Δ is calculated on the basis of a plurality of deviations Δ and, therefore, on the basis of multiple measurements. This mean value AV is then used for the final assessment as to whether the ultrasonic sensor 3 is blocked or not.

In principle, a binary decision as to whether the ultrasonic sensor 3 is blocked or not can be reached first. This can be carried out, for example, in that the evaluation unit 4 checks to determine whether the mean value AV lies in a specified value range about the value "0" or not. If the mean value AV lies in this value range about the zero value, the ultrasonic sensor 3 is not blocked. If the mean value AV is outside of this value range, it is assumed that the ultrasonic sensor 3 is blocked. Depending on the mean value AV, an extent and/or a type of blockage can also be determined, and, if necessary, the reduction of the detection zone or detection range of the ultrasonic sensor 3 can also be deduced. One example is shown in the following table:

| AV (Δ) | Possible type of soiling | Reduction of the detection zone |
|---|---|---|
| −1% ... −30% | Snow | Detection zone reduced by 20% |
| −31% ... −70% | Thin layer of ice | Detection zone reduced by 60% |
| −71% ... −100% | Thick layer of ice | Completely blind |
| +1% ... +30% | Water | Detection zone reduced by 20% |
| +31% ... +70% | Thin layer of mud | Detection zone reduced by 60% |
| +71% ... +100% | Thick layer of mud | Completely blind |

Since the different driver assistance systems 7a to 7x also require different detection zones of the ultrasonic sensor 3, an assessment of the reduction of the detection zone can be carried out separately for each driver assistance system 7a to 7x. In this case, a separate decision can be made, for example, for each driver assistance system 7a to 7x as to whether a warning message should be output and/or whether the particular driver assistance system 7a to 7x should be switched off.

The invention claimed is:

1. A method for detecting a blocked state of an ultrasonic sensor of a motor vehicle, the method comprising:
sensing an actual value of at least one oscillation parameter of the ultrasonic sensor;
detecting a current temperature to which the ultrasonic sensor is exposed by a temperature detecting device, wherein the current temperature is detected by a temperature sensor of the temperature detection device disposed on and/or in the ultrasonic sensor;

determining, by the evaluation unit, a reference value as a function of the current temperature;

repeatedly comparing, by an evaluation unit, the actual value sensed with the reference value to generate a plurality of deviations of the actual value from the reference value;

determining, subsequent to generating the plurality of deviations, a mean value of the plurality of deviations;

detecting, based on the mean value of the plurality of deviations, the blocked state of the ultrasonic sensor; and determining, based on the mean value of the plurality of deviations, an extent and/or a type of blockage of the ultrasonic sensor.

2. The method according to claim 1, further comprising detecting a current ambient temperature of the ultrasonic sensor as the temperature, by a temperature sensor of the temperature detection device disposed in the area of the ultrasonic sensor.

3. The method according to claim 1, further comprising detecting the actual value of a resonance frequency of the ultrasonic sensor, as the oscillation parameter and determining an ideal value of the resonance frequency, as the reference value for the resonance frequency, as a function of the current temperature.

4. The method according to claim 1, further comprising detecting the actual value of a reverberation time of the ultrasonic sensor, as the oscillation parameter, and determining an ideal value of the reverberation time, as the reference value for the reverberation time, as a function of the current temperature.

5. The method according to claim 1, further comprising:
determining that a sufficient number of deviations is present in the plurality of deviations,
wherein determining the mean value of the plurality of deviations is in response to determining that the sufficient number of deviations is present in the plurality of deviations.

6. The method according to claim 1, wherein depending on the comparisons, a reduction in the detection zone of the ultrasonic sensor caused by the blockage is determined.

7. The method according to claim 1, wherein at least two ultrasonic sensors of the motor vehicle are each checked with respect to the blocked state, and the current temperature is detected separately for each ultrasonic sensor, and the reference value is determined separately for each ultrasonic sensor depending on the particular temperature.

8. An ultrasonic sensor device for a motor vehicle, comprising:
at least one ultrasonic sensor; and
an evaluation unit for:
detecting an actual value of at least one oscillation parameter of the ultrasonic sensor,
repeatedly comparing said actual value with a reference value to generate a plurality of deviations of the actual value from the reference value,
determining, subsequent to generating the plurality of deviations, a mean value of the plurality of deviations, and
detecting, based on the mean value of the plurality of deviations, a blocked state of the ultrasonic sensor, and
determining, based on the mean value of the plurality of deviations, an extent and/or a type of blockage of the ultrasonic sensor,
wherein the evaluation unit is designed for determining, during operation, the reference value as a function of a detected current temperature to which the ultrasonic sensor is exposed, wherein the detected current temperature is detected by a temperature sensor of a temperature detection device disposed on and/or in the ultrasonic sensor.

9. A motor vehicle comprising an ultrasonic sensor device according to claim 8.

* * * * *